(No Model.)
P. SCHOOP.
METHOD OF MAKING ELECTRODES FOR SECONDARY BATTERIES.
No. 434,301. Patented Aug. 12, 1890.
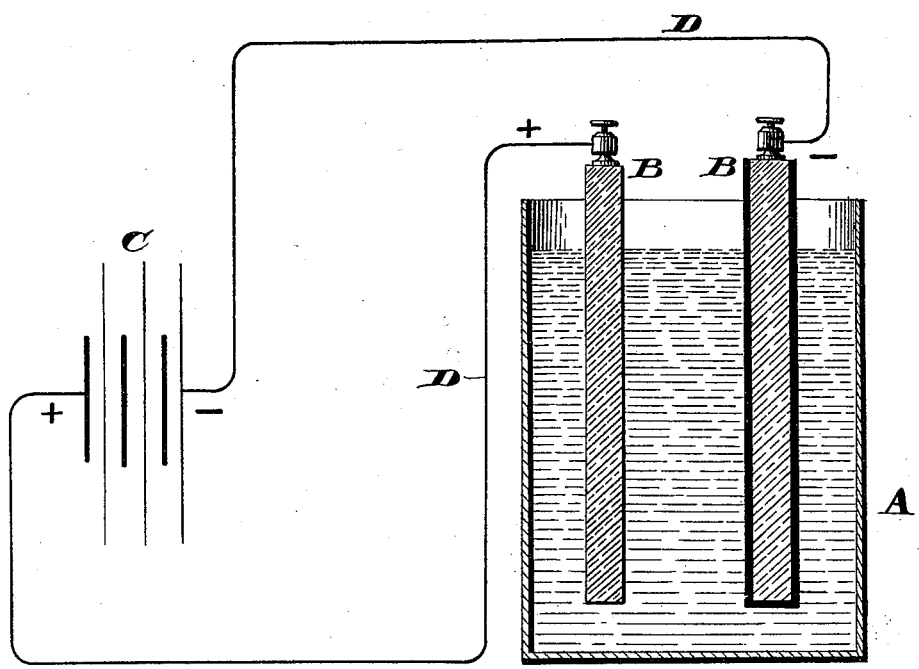
WITNESSES:
INVENTOR:
Paul Schoop,

UNITED STATES PATENT OFFICE.

PAUL SCHOOP, OF ZURICH, SWITZERLAND.

METHOD OF MAKING ELECTRODES FOR SECONDARY BATTERIES.

SPECIFICATION forming part of Letters Patent No. 434,301, dated August 12, 1890.

Application filed March 10, 1890. Serial No. 343,330. (No model.)

*To all whom it may concern:*

Be it known that I, PAUL SCHOOP, a citizen of the Republic of Switzerland, and a resident of Zurich, Switzerland, have invented certain new and useful Improvements in Methods of Manufacturing Electrodes for Secondary Batteries; and I do hereby declare that the following is a full, clear, and exact description of the invention, which will enable others skilled in the art to which it appertains to make and use the same, reference being had to the accompanying drawing, which forms a part of this specification.

This invention relates to the production of lead accumulators or secondary batteries without the application of a "paste" or plastic material of any kind. As is well known, a majority of the lead accumulators or electrodes now in use in storage-batteries are composed of a plate or body made of lead, (technically called a "grid,") which is provided with a coating of white lead, minium, litharge, or other suitable lead oxide or salt of lead, which is applied in a plastic state either to the flat surfaces of the electrode, or the latter may be provided with depressions or recesses, which are filled with the oxide or salt in a plastic state. Experience has demonstrated, however, that all electrodes of that type are subjected to different drawbacks, among which may be mentioned the pealing off or displacement of the paste or active material, the speedy disintegration of the same requiring frequent renewals, and the great weight of that class of electrodes.

My invention has for its object to overcome these drawbacks and produce an electrode for secondary or storage batteries without the use of paste or plastic material of any kind, which shall be capable of receiving a high charge of electricity, which may be produced at a minimum of cost, and which may be recharged in a simple and expeditious manner.

With these objects in view my invention consists in the hereinafter-described method of producing a lead electrode by electro-chemical means or the electro-chemical treatment of the lead body of the electrode or accumulator.

For the better illustration and explanation of my method, I have shown on the accompanying drawing in diagrammatic form a simple apparatus by which the same may be carried out. In this form of apparatus the letter A designates the electrolytic vessel; B B, two lead electrodes suspended in the same and in course of formation; C, the dynamo or battery from which the plates are to be formed, and D the connecting-wires.

In carrying out my invention I suspend the plates (or series of plates) B B in a solution of mercury salt, preferably mercurous sulphate, (containing about five per cent. of this salt,) within the vessel A, which is filled with this solution, slightly acidulated by sulphuric acid. I then connect one of these plates with the negative pole of the dynamo or generator and the other with the positive pole of the same, thus passing a current through the solution contained in the electrolytic vessel A and through the plates. It will now be found that the first plate (the cathode) becomes covered with a film of metallic mercury, while the other plate (the anode) apparently remains unaltered. The mercury deposited upon the cathode quickly forms an amalgam with the lead, penetrating its surface to a certain depth, and in order to insure a satisfactory result in this respect the strength of current must be kept within a certain limit, (depending upon the exposed surface or area of the electrode,) in order to avoid a too great accumulation of metallic mercury on the plate, which might cause it to drop off before the amalgam is formed. I do not limit myself, however, to any specific volume or strength of current. Also additions of other salt, like sulphate of ammonia, may be made, and the density of the acid solution may be varied, as may also the temperature of it and the duration of exposition of the plate to the current, points of importance in the practical carrying out of my process, which are readily determined by preliminary experiments and experience, I having found that the deposit of metallic mercury increases with the strength of current, with the rise of temperature of the solution, and with the time of exposition, which may vary between ten and thirty hours, according to circumstances, the shorter time being preferable. After this treatment I reverse the direction of the current, the current now en tering at the plate which was formerly the cathode, passing from it to the other plate, (former anode,) which now becomes cathode, and then back to the generator C. In other words, the electric quality of the two plates or electrodes B B is reversed, the cathode becoming the anode by this reversal of the electric current from the generator, and vice versa, which is accomplished without disturbing the plates. The result of this is that the mercury deposited upon one of the lead plates becomes dissolved and transferred from this plate to the other one, (formerly the anode, but now the cathode.) As soon as all the mercury has been removed in this manner by electric chemical action this plate is taken out of the bath, washed and rinsed with water, and is now ready for the ordinary charging. In its place a fresh plate is suspended in the solution opposite to the remaining plate, and now the current is again reversed. This results in the mercury which has been deposited upon the old remaining plate being again dissolved and deposited upon the fresh plate, resulting in the old plate getting in the same condition as the first one by the amalgamation of the lead surface with the mercury deposited thereon—that is to say, the lead surface has become spongy, so as to make it fit, after washing, for the ordinary charging. This charging process is the same as that usually followed in forming electrodes for secondary batteries, viz: The two plates or series of plates treated as described are placed within a vessel containing diluted sulphuric acid—say about 1.15 specific gravity—and charged with current in the usual manner until fully charged, after which the secondary cell is ready for use. By this method I obtain high-capacity plates in a short time and without waste of energy or material. These plates are not subject to deterioration, as plates composed in part of the oxides or salts of lead in a plastic state are of less weight for a corresponding area of active surface, and can be produced in less time and at considerably less expense.

It will of course be evident that the mode of operation hereinbefore set out is, to a degree at least, applicable with other substances than lead and mercury, the essential feature of my invention being that the surface of the plate or element shall first have incorporated with it a substance which, when subsequently removed, leaves such surface in a spongy condition for use as an element in a secondary battery. It will be readily observed that the means by which this substance is incorporated with the surface of the electrode may be greatly varied, and also that an equal variety of means may be employed for discharging such substance—as, for example, in the case of mercury it could be discharged, to a great degree, at least, by the proper application of heat. Neither is it important that the entire electrode should be of the same material as its surface.

Having thus described my invention, I claim and desire to secure by Letters Patent of the United States—

1. The hereinbefore-described method of producing or manufacturing electrodes for secondary batteries, which consists in the deposition of mercury upon the lead plates forming the body of the electrodes, whereby an amalgam of lead and mercury is formed on the surface of the lead electrode, and subsequently dissolving out the mercury so as to leave a spongy surface, substantially as set forth.

2. The hereinbefore-described method of producing or manufacturing electrodes for secondary batteries, which consists in, first, depositing a thin film of metallic mercury upon the surface of the plate; secondly, dissolving, by electro-chemical action, the mercury of the amalgam, and, lastly, charging the electrode thus produced in the usual manner, substantially as set forth.

3. The electro-chemical method herein described of dissolving the metallic mercury of the mercury and lead amalgam on a lead electrode in course of formation by reversing the electric current employed in depositing the mercury upon the plate in the first stage of the making of the electrode, substantially as set forth.

4. The described method or process of producing a spongy surface on the lead plates or grids of secondary batteries, which consists in, first, depositing a film of metallic mercury upon the surface of the plate by electro-chemical action; secondly, disassociating the lead and mercury formed by the amalgamation of the two metals by reversing the electric current, and, thirdly, removing all traces of the mercury by washing, substantially as set forth.

5. A method of producing electrodes for secondary batteries, which consists in electrically incorporating mercury with the lead surface of the plate and then subsequently discharging such battery by any means whatever, so as to leave a spongy surface.

In testimony that I claim the foregoing as my own I have hereunto affixed my signature in presence of two witnesses.

PAUL SCHOOP.

Witnesses:
JOHN GOODE,
MICHAEL GOODE.